(12) United States Patent
Hollis

(10) Patent No.: US 8,406,356 B2
(45) Date of Patent: Mar. 26, 2013

(54) SELF-CALIBRATING CONTINUOUS-TIME EQUALIZATION

(75) Inventor: Timothy M. Hollis, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 860 days.

(21) Appl. No.: 11/759,072

(22) Filed: Jun. 6, 2007

(65) Prior Publication Data

US 2008/0304557 A1    Dec. 11, 2008

(51) Int. Cl.
H04B 1/10 (2006.01)
H03H 7/30 (2006.01)

(52) U.S. Cl. ........................................ 375/350; 375/231

(58) Field of Classification Search .......... 375/229–233, 375/285, 346, 348, 350; 708/300, 322, 323
See application file for complete search history.

(56) References Cited

U.S. PATENT DOCUMENTS

| | | | | |
|---|---|---|---|---|
| 3,723,911 A * | 3/1973 | Forney, Jr. | | 333/18 |
| 4,027,258 A * | 5/1977 | Perreault | | 333/18 |
| 4,571,733 A * | 2/1986 | Kaku et al. | | 375/231 |
| 5,345,476 A * | 9/1994 | Tsujimoto | | 375/233 |
| 6,188,721 B1 * | 2/2001 | Shirani et al. | | 375/232 |
| 6,404,809 B1 * | 6/2002 | Zhang | | 375/232 |
| 6,704,355 B1 * | 3/2004 | Lai | | 375/231 |
| 2003/0165191 A1 * | 9/2003 | Kokuryo et al. | | 375/231 |
| 2004/0047409 A1 * | 3/2004 | Lee et al. | | 375/232 |

OTHER PUBLICATIONS

T.M. Hollis et al., "Mitigating ISI through self-calibrating continuous-time equalization," IEEE Transactions on Circuits and Systems I, vol. 53, No. 10, pp. 2234-2245 (Oct. 2006).
T.M. Hollis et al., "Self-calibrating continuous-time equalization targeting inter-symbol interference," Proceedings of the IEEE North-East Workshop on Circuits and Systems, Gatineau, Canada, pp. 109-112 (Jun. 2006).
R.W. Lucky et al., "Automatic equalization for digital communication," in Proc. IEEE, vol. 53, No. 1, pp. 96-97 (Jan. 1965).
R.W. Lucky and H.R. Rudin, "Generalized automatic equalization for communication channels," in Proc. IEEE, vol. 53, No. 3, pp. 439-440 (Mar. 1966).
S. Reynolds et al., "A 7-tap transverse analog-FIR filter in 0.13 μm CMOS for equalization of 10-Gb/s fiber-optic data systems," in Proc. IEEE Int. Solid-State Circuits Conf., pp. 330-331 (Feb. 2005).

(Continued)

*Primary Examiner* — Young T. Tse
(74) *Attorney, Agent, or Firm* — Schwegman, Lundberg & Woessner, P.A.

(57) ABSTRACT

Embodiments of the invention comprise a continuous-time equalizer for reducing ISI in data received from a communication channel, and methods and circuitry for tuning or calibrating that equalizer. Selected coefficients for a transfer function of the equalizer circuit are fixed, while other coefficients are tuned by an adaptive algorithm. The adaptive algorithm minimizes errors associated with the tunable coefficients based on one or more training signals sent by the transmitter and received by the equalizer circuit at the receiver. The training signals allow for a variety of error terms to be calculated, from which the tunable coefficients are updated so as to iteratively minimize the error terms and simultaneously tune the equalizer to more accurately compensate for the degrading effects of the channel.

45 Claims, 16 Drawing Sheets

OTHER PUBLICATIONS

M.E. Said et al., "A 0.5-μm SiGe pre-equalizer for 10-Gb/s single-mode fiber optic links," in Proc. IEEE Int. Solid-State Circuits Conf., pp. 224-225 (Feb. 2005).

J.E. Jaussi et al., "8-Gb/s source-synchronous I/O link with adaptive receiver equalization, offset cancellation, and clock de-skew," IEEE J. Solid-State Circuits, vol. 40, No. 1, pp. 80-88 (Jan. 2005).

M.E. Austin, "Decision-feedback equalization for digital communication over dispersive channels," Massachusetts Institute of Technology: Research Laboratory of Electronics, Cambridge, Tech. Rep. 461 (1967).

T. Beukema et al., "A 6.4-Gb/s CMOS SerDes core with feedforward and decision-feedback equalization," in Proc. IEEE Int. Solid-State Circuits Conf., pp. 62-63 (Feb. 2005).

R. Payne et al., "A 6.25-Gb/s binary adaptive DFE with first post-cursor tap cancellation for serial backplane communications," in Proc. IEEE Int. Solid-State Circuits Conf., pp. 68-69 (Feb. 2005).

J.W.M. Bergmans, "Decision feedback equalization for digital magnetic recording systems," IEEE Transactions on Magnetics, vol. 24, No. 1, pp. 683-688 (Jan. 1988).

J.E.C. Brown et al., "A CMOS adaptive continuous-time forward equalizer, LPF, and RAM-DFE for magnetic recording," IEEE J. Solid-State Circuits, vol. 34, No. 2, pp. 162-169 (Feb. 1999).

R.S. Kajley et al., "A mixed-signal decision-feedback equalizer that uses a look-ahead architecture," IEEE J. Solid-State Circuits, vol. 32, No. 3, pp. 450-459 (Mar. 1997).

B.K. Casper et al, "A 20Gb/s Forwarded clock transceiver in 90nm CMOS," Proceedings of the IEEE International Solid State Circuit Conference, San Francisco, California, pp. 263-272 (Feb. 2006).

Y. Tomita et al., "A 10-Gb/s receiver with series equalizer and on-chip ISI monitor in 0.11-μm CMOS," IEEE J. Solid-State Circuits, vol. 40, No. 4, pp. 986-993 (Apr. 2005).

H. Higashi et al., "A 5—6.4-Gb/s 12-Channel transceiver with pre-emphasis and equalization," IEEE J. Solid-State Circuits, vol. 40, No. 4, pp. 978-985 (Apr. 2005).

Chang et al., "The design of CMOS gigahertz-band continuous-time active lowpass filters with Q-enhancement circuits," in Proc. 9th Great Lakes Symp. VLSI, pp. 358-361 (Mar. 1999).

J. Brown and P. Hurst, "Continuous-time forward equalization for the decision-feedback-equalizer-based read channel," IEEE Transactions on Magnetics, vol. 34, No. 4 (Jul. 1998).

F. Bahmani et al., "An Accurate Automatic Quality-Factor Tuning Scheme for Second-Order LC Filters," IEEE Transactions on Circuits and Systems I, vol. 54, No. 4, pp. 745 (Apr. 2007).

\* cited by examiner

SELF-CALIBRATING CONTINUOUS-TIME EQUALIZATION

FIELD OF THE INVENTION

Embodiments of this invention relate to techniques and circuitry for reducing intersymbol interference (ISI) from data received on a signal path. This application is related to the papers titled "Mitigating ISI Through Self-Calibrating Continuous-Time Equalization," by T. M. Hollis et al, IEEE Transactions on Circuits and Systems I, Vol. 53, No. 10, pp. 2234-2245 (October 2006) and "Self-Calibrating Continuous-Time Equalization Targeting Inter-symbol Interference," by T. M. Hollis et al, Proceedings of the IEEE North-East Workshop on Circuits and Systems, Gatineau, Canada, pp. 109-112 (June 2006). These papers are hereby incorporated by reference in their entireties.

BACKGROUND

Circuit designers of multi-Gigabit systems face a number of challenges as advances in technology mandate increased performance in high-speed components. For example, chip-to-chip data rates have traditionally been constrained by the bandwidth of input/output (IO) circuitry in each component. However, process enhancements (e.g., transistor bandwidth) and innovations in IO circuitry have forced designers to also consider the effects of the transmission channels between the chips on which data is sent.

At a basic level, data transmission between components within a single semiconductor device or between two devices on a printed circuit board may be represented by the system 100 shown in FIG. 1. In FIG. 1, a transmitter 102 (e.g., a microprocessor) sends data over channel 104 (e.g., a copper trace on a printed circuit board or "on-chip" in a semiconductor device) to a receiver 106 (e.g., another processor or memory). When data is sent from an ideal transmitter 102 to a receiver 106 across an ideal (lossless) channel, all of the energy in a transmitted pulse will be contained within a single time cell or unit interval (UI).

However, real transmitters and real transmission channels do not exhibit ideal characteristics, and as mentioned above, the effects of transmission channels are becoming increasingly important in high-speed circuit design. Due to a number of factors, including, for example, the limited conductivity of copper traces, the dielectric medium of the printed circuit board (PCB), and the discontinuities introduced by vias, the initially well-defined digital pulse will tend to spread or disperse as it passes over the transmission path. This is shown in FIG. 2A. As shown, a single pulse of data 105*a* is sent by the transmitter 102 during a given UI (e.g., UI3). However, because of the effect of the channel 104, this data pulse becomes spread 105*b* over multiple UIs at the receiver 106, i.e., some portion of the energy of the pulse is observed outside of the UI in which the pulse was sent (e.g., in UI2 and UI4). This residual energy outside of the UI of interest may perturb a pulse otherwise occupying either of the neighboring UIs, in a phenomenon referred to as intersymbol interference (ISI).

ISI is shown more succinctly in the simulation of FIG. 2B. Shown are two ideal pulses, $\pi_1$ and $\pi_2$, each occupying their own adjacent unit intervals. The resulting dispersed pulses, $P_1$ and $P_2$, represent simulated received versions of the ideal pulses after transmission at 10 Gb/s through a 6-inch copper trace in a standard printed circuit board material (FR4). The dispersion in each of these pulses overlaps the other pulse, as shown by the hatched portions in the drawings, which represent ISI. The larger pulse, $P_3$, represents the waveform that results when $P_1$ and $P_2$ are sent across the same channel with no intermediate delay, which is a common occurrence in the standard non-return-to-zero (NRZ) signaling format.

Because ISI can give rise to sensing errors at the receiver 106, a number of solutions have been proposed to offset or compensate for the effects of ISI. On the transmitter 102 side, a filter 108 may be employed to compensate for the anticipated effects of the channel 104. Such a filter 108, which can comprise an equalizer, attempts to pre-condition the transmitted signal such that the effect of the channel 104 is removed. One skilled in the art will appreciate that the terms "equalizer," "equalization filter," "filter," etc., may be used interchangeably in this regard. One such technique comprises the use of finite-impulse response (FIR) filters. See, e.g., R. W. Lucky et al., "Automatic equalization for digital communication," in Proc. IEEE, vol. 53, no. 1, pp. 96-97 (January 1965); R. W. Lucky and H. R. Rudin, "Generalized automatic equalization for communication channels," in Proc. IEEE, vol. 53, no. 3, pp. 439-440 (March 1966); S. Reynolds et al., "A 7-tap transverse analog-FIR filter in 0.13 μm CMOS for equalization of 10-Gb/s fiber-optic data systems," in Proc. IEEE Int. Solid-State Circuits Conf., pp. 330-331 (February 2005); M. E. Said et al., "A 0.5-μmSiGe pre-equalizer for 10-Gb/s single-mode fiber optic links," in Proc. IEEE Int. Solid-State Circuits Conf, pp. 224-225 (February 2005); and J. E. Jaussi et al., "8-Gb/s source-synchronous I/O link with adaptive receiver equalization, offset cancellation, and clock de-skew," IEEE J. Solid-State Circuits, vol. 40, no. 1, pp. 80-88 (January 2005); all of which are incorporated herein by reference in their entireties. Such an FIR filter 108 performs processes known as pre-emphasis or de-emphasis in which the signal is intentionally pre-distorted before it is transmitted to compensate for the anticipated effects of the channel 104. An FIR filter 108 may alternatively be employed on the receiver side 106 (not shown) to compensate for effects of the channel. Unfortunately, FIR filters typically require multiple taps to compensate for the losses in a channel, resulting in larger, more power-hungry, and more complicated circuitry.

Alternatively, on the receiver 106 side, an equalizer implemented in circuitry 109 may be used to compensate for the effects of the channel 104, including ISI. The transfer function of an ideal equalizer is the inverse of the transfer function of the channel 104, and a practical equalizer attempts to recreate this inverse frequency response. One such ISI-mitigating technique includes the use of decision feedback equalization (DFE) circuitry 109 at the receiver 106 side of the transmission. See, e.g., M. E. Austin, "Decision-feedback equalization for digital communication over dispersive channels," Massachusetts Institute of Technology: Research Laboratory of Electronics, Cambridge, Tech. Rep. 461(1967); M. Sorna et al., "A 6.4-Gb/s CMOS SerDes core with feedforward and decision-feedback equalization," in Proc. IEEE Int. Solid-State Circuits Conf., pp. 62-63 (Feb. 2005); R. Payne et al., "A 6.25-Gb/s binary adaptive DFE with first post-cursor tap cancellation for serial backplane communications," in Proc. IEEE Int. Solid-State Circuits Conf., pp. 68-69 (Feb. 2005); J. W. M. Bergmans, "*Decision feedback equalization for* digital magnetic recording systems," IEEE Trans. Magn., vol. 24, pt. 1, pp. 683-688 (January 1988); J. E. C. Brown et al., "A CMOS adaptive continuous-time forward equalizer, LPF, and RAM-DFE for magnetic recording," IEEE J. Solid-State Circuits, vol. 34, no. 2, pp. 162-169 (February 1999); and R. S. Kajley et al., "A mixed-signal decision-feedback equalizer that uses a look-ahead architecture," IEEE J. Solid-State Circuits, vol. 32, no. 3, pp. 450-459(March 1997); all of which are incorporated herein by reference in their entireties. DFE presents an attractive solution as it is fairly resistant to high-frequency noise amplification, and further provides a variable detection threshold that may be designed to follow shifts or trends in data resulting from ISI. However, DFE is more difficult to implement than an FIR filter in the multi-Gigahertz frequency range due to the necessary reliance on feedback from past decisions.

A third filtering option comprises continuous-time equalization, which is implemented by circuitry 109 at the receiver 106 side of the transmission. See, e.g., B. K. Casper et al, "A 20 Gb/s Forwarded Clock Transceiver in 90 nm CMOS," Proceedings of the IEEE International Solid State Circuit Conference, San Francisco, Calif., pp. 263-272 (February 2006); Y. Tomita et al., "A 10-Gb/s receiver with series equalizer and on-chip ISI monitor in 0.11-μm CMOS," IEEE J. Solid-State Circuits, vol. 40, no. 4, pp. 986-993 (April 2005); and H. Higashi et al., "A 5-6.4-Gb/s 12-channel transceiver with pre-emphasis and equalization," IEEE J. Solid-State Circuits, vol. 40, no. 4, pp. 978-985 (April 2005), all of which are incorporated herein by reference in their entireties. While continuous-time filters contribute very little to a system in terms of power, noise, and jitter, they are more difficult to tune. Moreover, the performance of an adaptive equalizer, such as a traditional continuous-time equalizer, is limited by process variations inherent in printed circuit board fabrication; such variations limit the precision with which a chip-to-chip channel may be formed (trace impedance, spacing, length matching, etc.), and thus, limit the amount or accuracy of compensation an equalizer may provide. While process variations lead to some variation in a channel, a major challenge related to continuous-time filters and equalizers is the process variance in the equalizer circuits themselves. The frequency response of a continuous-time equalizer cannot be expected to fit the intended design initially due to process and environmental variability, and thus, calibration is necessary not only to optimize the equalizer to a specific channel, but also to compensate for the non-idealities of the equalizer circuits themselves.

DETAILED DESCRIPTION

Embodiments of the invention comprise a continuous-time equalizer for reducing ISI in data received from a communication channel, and methods and circuitry for tuning or calibrating that equalizer. Selected coefficients for a transfer function of the equalizer circuit are fixed, while other coefficients are tuned by an adaptive algorithm. The adaptive algorithm minimizes errors associated with the tunable coefficients based on one or more training signals sent by the transmitter and received by the equalizer circuit at the receiver. The training signals allow for a variety of error terms to be calculated, from which the tunable coefficients are updated so as to iteratively minimize the error terms and simultaneously tune the equalizer to more accurately compensate for the degrading effects of the channel.

The equalizer, according to one or more embodiments of the invention, attempts to compensate for the frequency and phase response of the channel to produce an overall frequency response that is as flat as possible over the bandwidth of the data being transmitted or a bandwidth of interest, i.e., to normalize the frequency response and minimize group delay variation or non-linear phase response. The transfer function of such a compensating equalizer may be represented generically as a second-order filter having a single zero and a complex pole:

$$F(s) = \frac{s+a}{s^2 + bs + c}. \quad \text{(Eq. 1)}$$

In terms of physical values, this function may be represented as $$F(s) = \frac{s+z}{s^2 + \frac{\omega_0}{Q}s + \omega_0^2} \quad \text{(Eq. 2)}$$

where z represents the zero frequency, $\omega_0$ represents the filter's natural resonant (peaking) frequency, and Q represents the quality factor of the equalizer circuit.

One or more of the above coefficients is preferably fixed by a designer of the system according to an embodiment of the disclosed techniques. Once one or more of the coefficients are fixed, the remaining coefficients may be tuned pursuant to the disclosed techniques to obtain an "optimized" coefficient value for the equalizer and target channel. As is always the case, the term "optimized" is subjective, and is correlated to the error criterion chosen for the system. The error criterion, to which each of the example embodiments is associated, is a "zero-forcing" criterion. Thus, the tunable coefficients are manipulated to zero out specific ISI terms.

Figure 1:
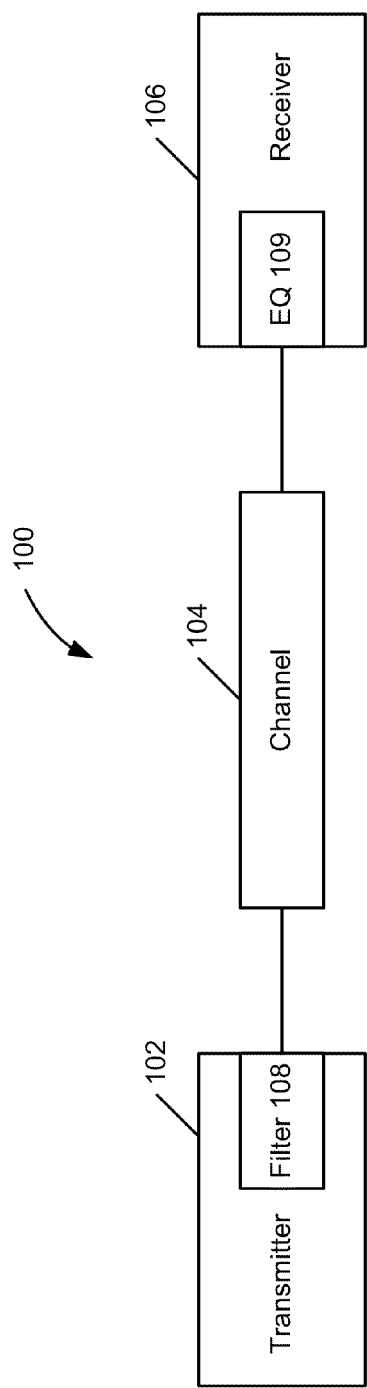
FIG. 1 illustrates a block diagram of a transmission system on a printed circuit board.
Figure 2A:
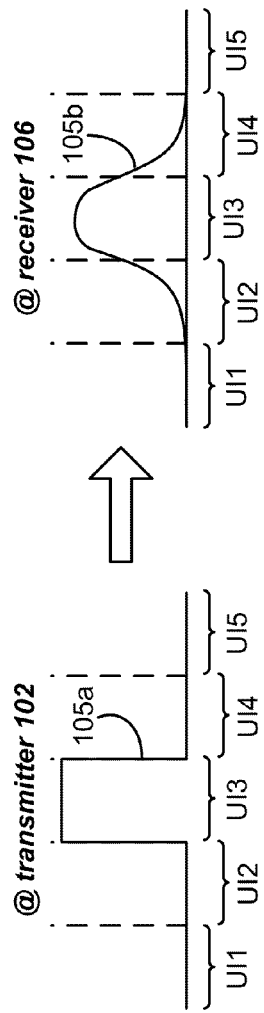
FIGS. 2A and 2B illustrate the effect of a transmission channel on pulses sent across the channel, and in particular show intersymbol interference (ISI).
Figure 2B:
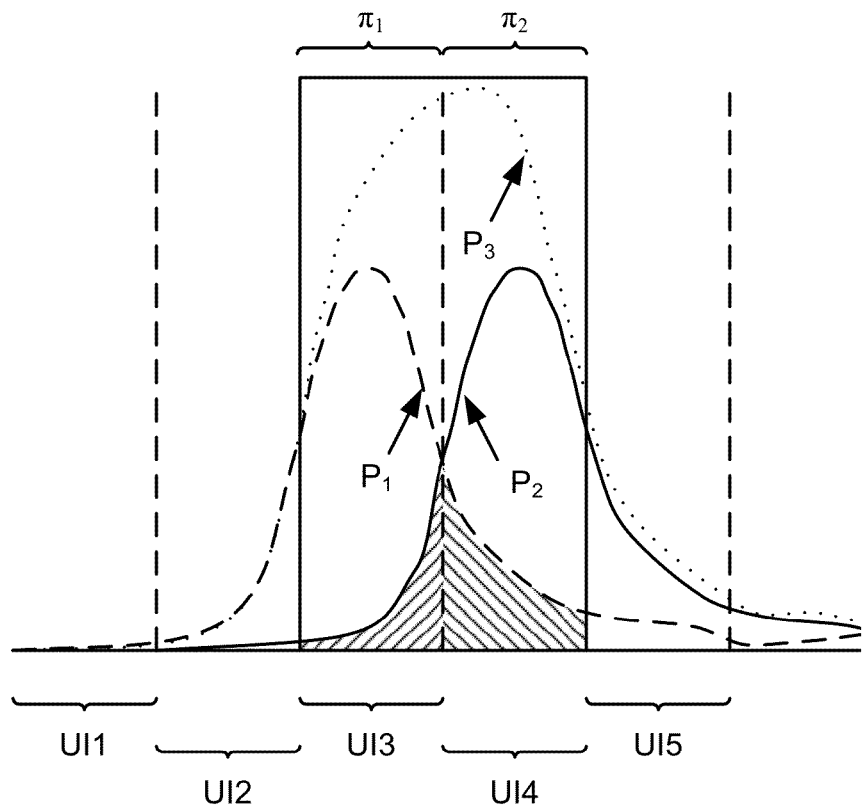

Because the heuristics associated with fixing the circuit Q are less intuitive, the first example of single coefficient tuning, in accordance with one or more embodiments of the invention, employs Q-tuning, while $\omega_0$ and z are assumed to be fixed. Nearly any equalizer that allows for Q to be adjusted may be used as a Q-tunable equalizer. One such Q-tunable equalizer can be found in FIG. 2 of Chang et al., "The Design of CMOS Gigahertz-Band Continuous-Time Active Lowpass Filters with Q-Enhancement Circuits," in Proc. 9th Great Lakes Symp. VLSI, pp. 358-361 (March 1999), which is incorporated by reference in its entirety. One skilled in the art will appreciate that numerous Q-tunable equalizer circuits may be designed that are usable in embodiments according to the invention.

In a preferred embodiment in which a Q-tunable equalizer is used, the other transfer function coefficients ($\omega_0$, z) are fixed by a designer of the system using logical approximations. For example, the zero frequency z may be approximated and fixed by a circuit designer through observing the frequency response of the channel for which the equalizer is being tuned, with the zero frequency chosen one decade below the point where the channel attenuates the data by 20 decibels (dB). This is logical, because a zero generally produces a +20 dB/decade boost in the response of the equalizer, and therefore, placing a zero a decade below that point results in reasonable compensation up to the original –20 dB frequency. For example, if a given channel experiences a 20 dB loss at 4.7 GHz, an appropriate approximation for the zero frequency z is at 470 MHz. Choosing the zero frequency z in this manner tends to flatten the frequency response for the channel in the decade prior to where the 20 dB loss occurs (i.e., from 470 MHz to 4.7 GHz).

The peaking frequency of the equalizer ($\omega_0$ in the transfer function) may also be logically approximated by a designer of a system. Tuning the transfer function to produce high frequency peaking not only provides for more aggressive high frequency loss compensation, but also reduces high frequency noise amplification through the inherently sharp roll-off in the equalizer response above the resonant frequency. In a preferred embodiment, $\omega_0$ is not placed so low as to cause significant over-equalization due to the effects of the zero and the peaking of the complex denominator overlapping. Similarly, $\omega_0$ is not placed so high as to prevent the peaking from contributing to the equalizer response over the frequencies of interest. In most cases the location of the peaking frequency $\omega_0$ may be chosen as twice the data rate of data in the channel. For example, if the data rate for the channel is 10 Gbps, $\omega_0$ is chosen as twice the data bandwidth, or 10 GHz, assuming half-rate clocking or DDR functionality, which is typical in many applications.

Figure 3:
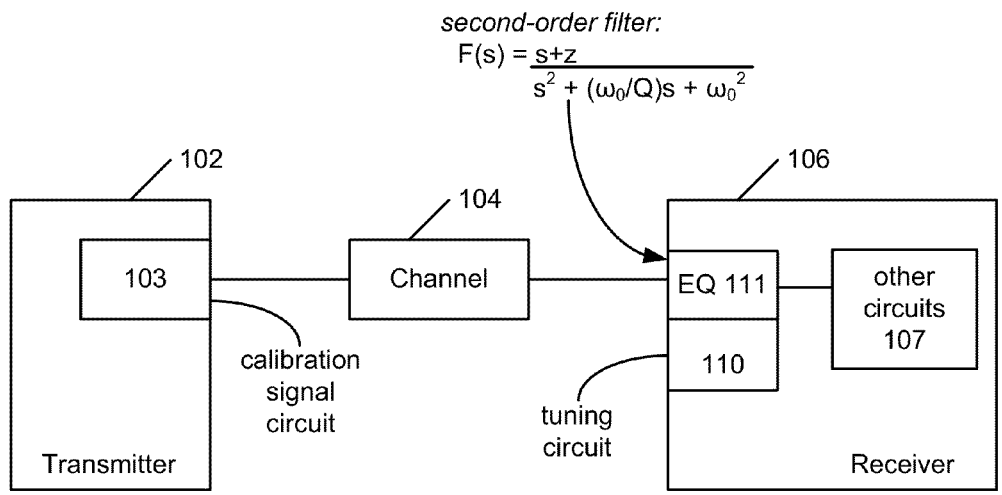
FIG. 3 illustrates a block diagram of a transmission system in accordance with one or more embodiments of the invention.

With z and $\omega_0$ so logically fixed, the disclosed technique turns to the tuning of Q. Tuning or adaptation of a tunable equalizer coefficient is accomplished through multiple iterations of a tunable equalizer circuit, and is directed by the minimization of a predetermined error metric. Reducing this error metric coincides with approaching the "optimal" equalizer response. One skilled in the art will appreciate that numerous error terms may be derived, and similarly, numerous embodiments of tunable equalizer circuits are possible. Other error terms, circuit implementations, and modifications will also be introduced according to other various embodiments of the invention. FIGS. 3-5 discuss one embodiment according to the invention suitable for tuning Q, assuming the remaining two coefficients are fixed, though with slight modification the example could be altered to adjust either $\omega_0$ or z.

FIG. 3 shows a basic system diagram for implementing the disclosed technique. As shown the receiver 106 contains an equalizer 111 which, as just noted, is to be tuned in accordance with the technique. More specifically, tuning of the equalizer is the function of tuning circuit 110, whose structures and functions will be explained later. Tuning of the equalizer 111 in preferred embodiments requires the assistance of the transmitter 102, which is modified to include a training signal circuit 103. As will be described in further detail below, the transmitter sends training signals, comprising single and/or double pulses to the equalizer 111. Preferably these training signals are sent only upon initialization of the system, e.g., when the system is first powered up. However, this is not strictly necessary as will be discussed further below. In any event, the tuning circuit 110 assesses the training signals and iteratively attempts to minimize the prescribed error term by tuning the equalizer 110 in ways designed to reduce ISI. Once tuned, the equalizer 111 can send its output to other circuits 107 within the receiver, such as data buffers, latches, or logic gates, etc.

Figure 4A:
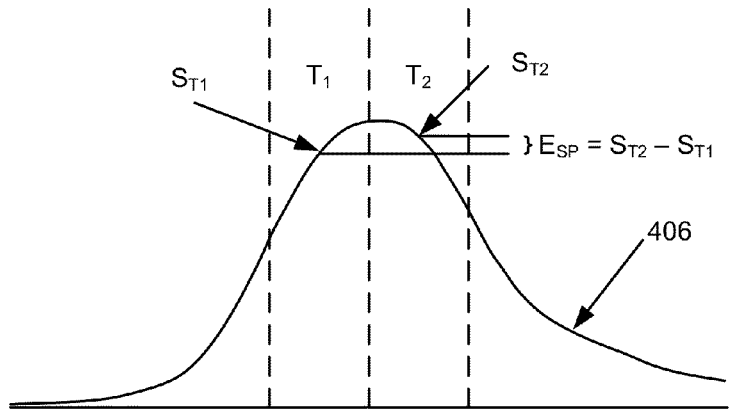
FIG. 4A illustrates the derivation of symmetric pulse error in accordance with one or more embodiments of the invention.
Figure 5:
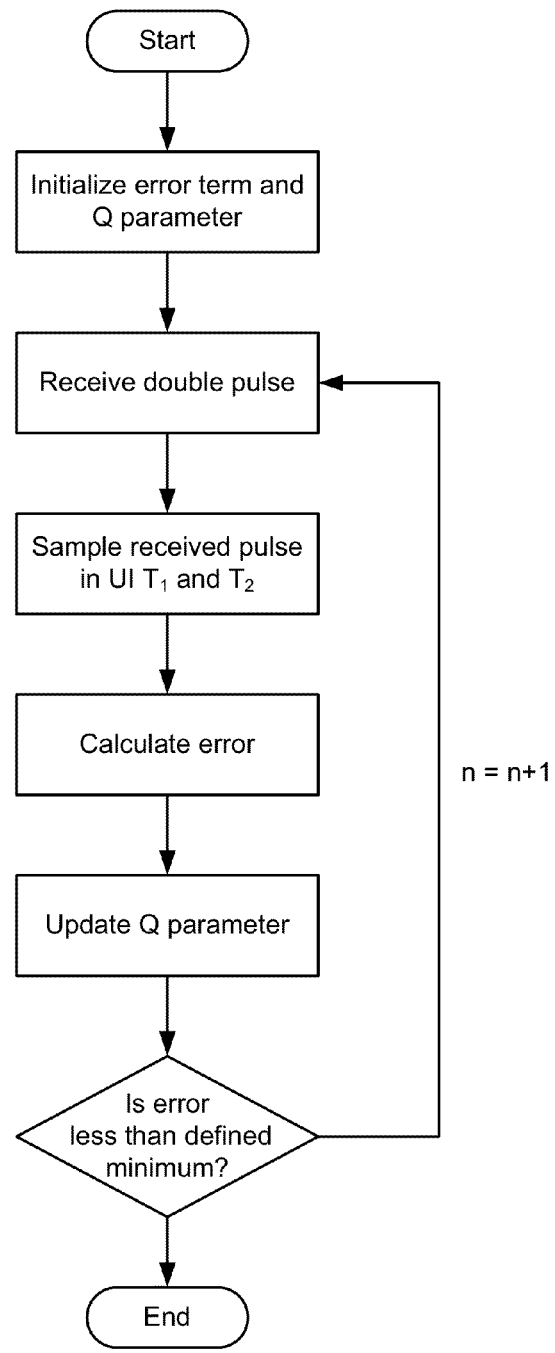
FIG. 5 illustrates a flow chart showing a calibration process in accordance with one or more embodiments of the invention.

FIG. 4A shows how one error term, the "symmetric pulse error" $E_{SP}$, is derived. FIG. 4A shows the waveform 406 that results when two '1' pulses are sent from a transmitter across a lossy channel to a receiver in consecutive time intervals $T_1$ and $T_2$ (e.g., pulses P1 and P2 shown in FIG. 2B). $E_{SP}$ is derived based on the assumption that if two ideal '1' pulses are sent to the receiver in consecutive UIs, then the two pulses should contribute equally to the overall pulse shape. Therefore, if sampled cursor values taken at the center of the two UIs, $S_{T1}$ and $S_{T2}$, are different, this comprises error, which the disclosed circuitry and technique seek to minimize. Thus, in general terms, the disclosed error term comprises a difference indicative of asymmetry in a received signal.

Figure 4B:
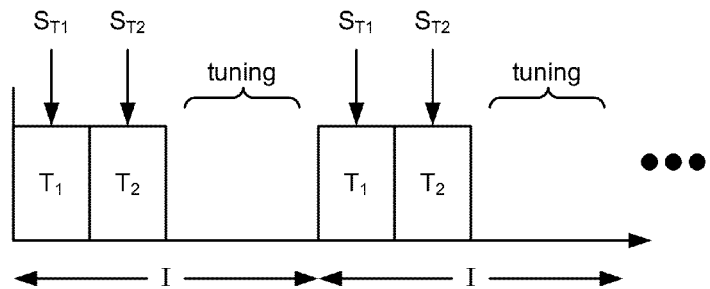
FIG. 4B illustrates training signals for symmetric pulse tuning in accordance with one or more embodiments of the invention.
Figure 4C:
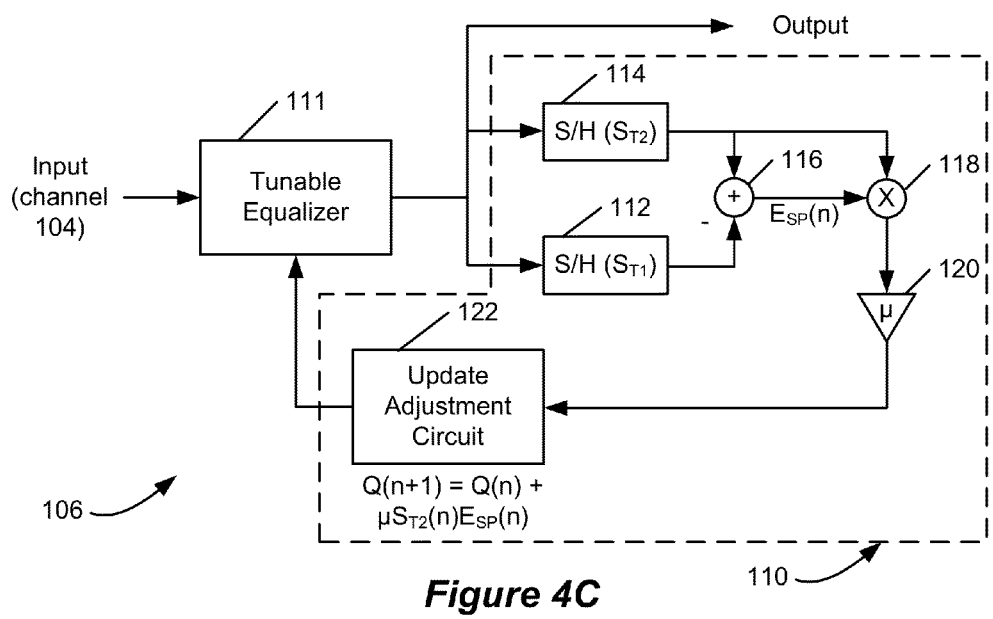
FIG. 4C illustrates a block diagram for symmetric pulse tuning in accordance with one or more embodiments of the invention.

FIG. 4B shows a basic timing diagram of training signals sent by the transmitter 102, and FIG. 4C shows a receiver circuit 106 for receiving those signals to tune the equalizer. As shown in FIG. 4B, 'I' represents one tuning interval, and due to the iterative nature of the technique, more than one interval 'I' would normally be required to minimize the error term $E_{SP}$ and tune the Q of the equalizer. During each time interval I, a double pulse training signal (two consecutive '1' pulses) is sent across channel 104 to the receiver circuit 106. Each of the pulses in the double pulse, after being passed through the tunable equalizer circuit 111, is sampled by a tuning circuit 110 to deduce cursor sample values $S_{T1}$ and $S_{T2}$ (see FIG. 4C). The sampled values ($S_{T1}$ and $S_{T2}$) are then used by the tuning circuit 110 during the tuning period to calculate the symmetric pulse error, $E_{SP}$. This error is used by an update adjustment circuit 122 to tune (at least in this embodiment) the Q of the tunable equalizer circuit 111 to reduce the error during the next interval I, as will be explained in further detail below.

The tuning circuit 110 of FIG. 4C operates as follows, and is further summarized in the flow chart of FIG. 5. First, a training signal comprising sequential '1' pulses (e.g., a double pulse) is received and sampled at the tuning circuit 110. Specifically, a sample-and-hold block 112 samples the received signal during the first time interval $T_1$ to deduce $S_{T1}$. Then, a second sample-and-hold block 114 samples the received signal during the second time interval $T_2$ to deduce $S_{T2}$.

A difference is taken between the sampled values at addition block 116 (i.e., $S_{T1}$ is subtracted from $S_{T2}$), which results in the error term $E_{SP}$ at a particular iteration (n) in the tuning sequence. $E_{SP}$ is multiplied by the sampled value $S_{T2}$ at multiplier 118, which scales the error term by the actual sampled value affected by the error. The product of multiplier 118 is then scaled by a scale factor $\mu$ in a buffer 120. This produces the update term for the next coefficient value (i.e., Q(n+1)) used in the update adjustment circuit 122 to tune the tunable equalizer circuit 111, as explained further below. The scale factor $\mu$ is used to balance between the rate of convergence of the error and the residual error. The scale factor $\mu$ may be any value greater than 0, and is typically less than 100. In a preferred embodiment of the invention, $\mu$ is 1. For purposes of example, in alternate embodiments of the invention, $\mu$ is 0.01.

Figure 4D:
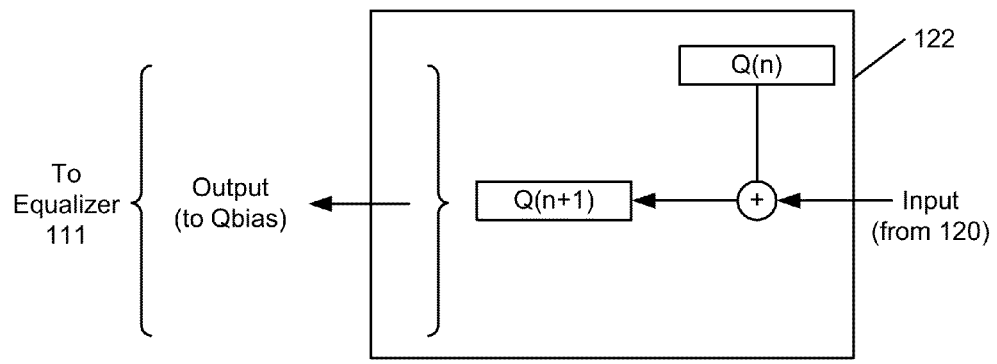
FIG. 4D illustrates a block diagram for an update adjustment circuit in accordance with one or more embodiments of the invention.
Figure 4E:
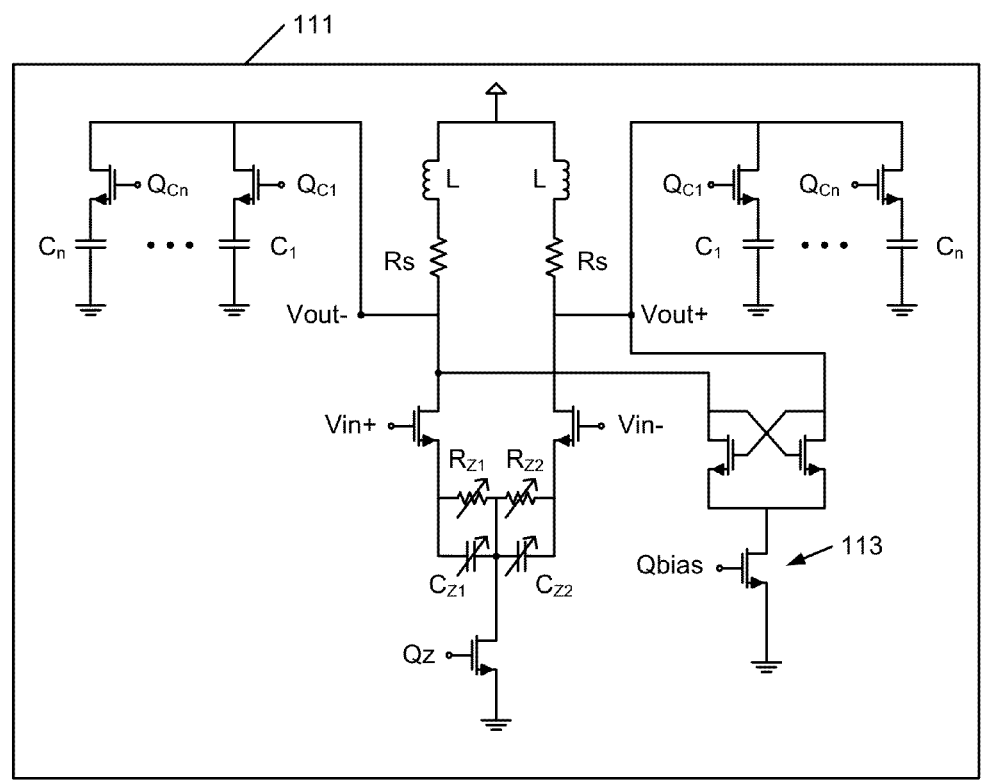
FIG. 4E illustrates a block diagram for a tunable equalizer circuit in accordance with one or more embodiments of the invention.

The update circuit 122, shown in further detail in FIG. 4D, adjusts internal circuit elements that control the tunable filter coefficient value Q of the tunable equalizer circuit 111. Of course, the exact construction of the update adjustment circuit 122 depends on the topology of the tunable equalizer circuit 111 that it controls. For example, the tunable equalizer circuit 111 shown in FIG. 4E allows for tuning of the Q coefficient based on a gate bias voltage Qbias of a transistor 113. Accordingly, Qbias comprises an output of the update adjustment circuit 122. Specifically, Qbias tunes the equalizer 111 by increasing the current through the transistor 113, which creates a negative resistance in series with the inductors L and resistors Rs to raise the Q coefficient. Other transistors in the tunable equalizer circuit 111 may be biased with predetermined bias voltages, or, may be variably biased by other outputs from the update adjustment circuit 122, as discussed above with reference to Qbias of transistor 113.

To summarize, the outputs from the update adjustment circuit 122 are compatible with the inputs of the tunable equalizer circuit 111 accordingly. Ultimately, the logic internal to the update adjustment circuit 122 takes the current Q value (Q(n)) and adds to it a the scaled version of the error metric ($\mu S_{T2} E_{SP}(n)$) to deduce the next updated Q value (Q(n+1)). Thus, the full coefficient update takes the form $$Q(n+1)=Q(n)+\mu E_{SP}(n)S_{T2}(n) \quad \text{(Eq. 3)}$$

which should be recognized as the least mean squared (LMS) approximation to the steepest or gradient descent update. As one skilled in the art will appreciate, this approach requires a register or other storage means to hold the current Q value, and otherwise may employ counters, adder circuits, analog-to-digital converters, digital-to-analog converters, or other common circuits to implement the desired update functionality. Such circuitry for a particular implementation is well within the skill of one in the art. Additionally, it should be understood that the update adjustment circuit 122 would also preferably set an initial Q value to be applied to the tunable equalizer circuit 111 prior to tuning. Such initial Q value can be set by a register within the update adjustment circuit 122 (not shown). It should also be understood that while an update for Q (Q(n+1)) is shown in FIG. 4D for purposes of explanation, similar update circuitry for z and $\omega_0$ may be derived, which is well within the skill of one in the art.

The iterations 'n' of the calibration sequence may be repeated until the error metric, $E_{SP}$, is less than a designer-specified threshold (e.g., 0.05 V). Alternatively, the number of iterations may be set to a specific number of cycles (e.g., 200) known to allow for adequate tuning. In any event, in a preferred embodiment, once adequate tuning of the tunable equalizer circuit 111 is achieved, the transmitter stops sending the training signals and the tuning circuit 110 is bypassed with only the tunable equalizer circuit 111 operating to produce the optimized and equalized output to the remainder of the receiver's circuitry.

Figure 4F:
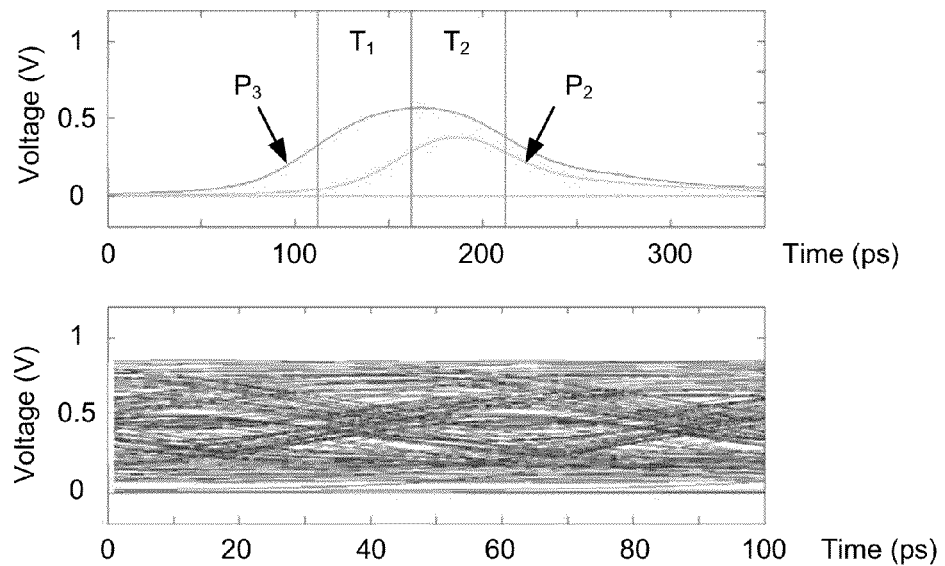
FIGS. 4F and 4G illustrate pulse responses and an eye diagram of an unequalized channel, and pulse responses and an eye diagram in accordance with one or more embodiments of the invention, respectively.
Figure 4G:
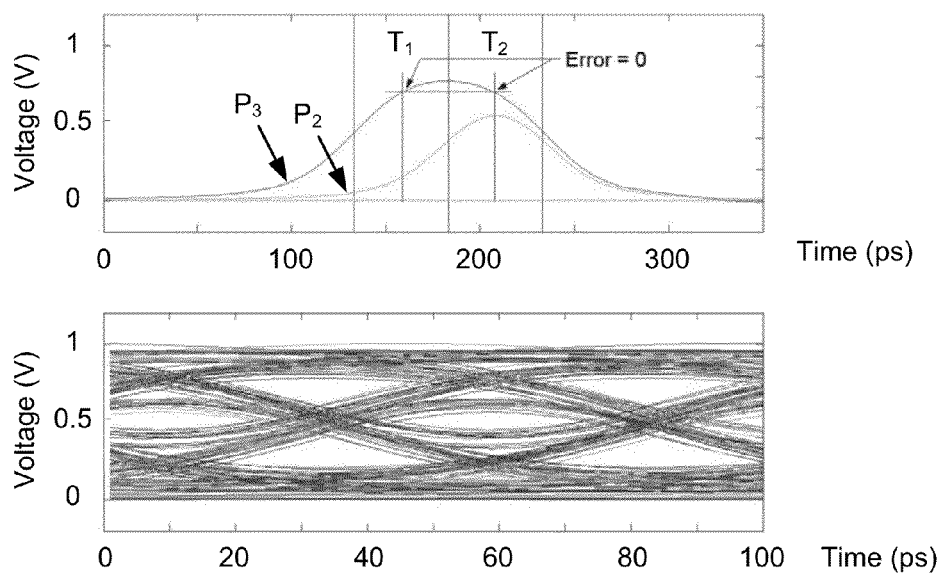

Circuit simulations using the tunable circuit 110 to tune the equalizer 111 indicate a noticeable improvement in signal quality in terms of ISI, as shown in FIGS. 4F and 4G. The upper window in FIG. 4F shows simulated pulses after transmission at 20 Gb/s across a 6-inch copper trace in a standard printed circuit board material (FR4), as received with no channel equalization. The resulting dispersed pulses, $P_2$ and $P_3$, are similar to the pulses shown in FIG. 2B. The lower window in FIG. 4F, shows the resulting ISI and noise on the unequalized channel in the form of an "eye diagram." As is well known to one skilled in the art, an eye diagram provides an indication of the amount of ISI and noise in a signal, and thus provides an indication of the probability of error or miss-detected bits. Clearly, as seen in the eye diagram of FIG. 4F, there is no voltage level where a threshold could be placed to allow error-free detection of the received signal. In other words, because the eye is closed in FIG. 4F, the simulation shows that without use of the tuned equalization techniques disclosed herein, data cannot be reliably received and interpreted at the receiver.

FIG. 4G, by contrast, depicts received simulated signals after tuning of the equalizer circuit 111 using the disclosed techniques and tuning circuit 110 of FIG. 4C and assuming the equalizer transfer function of Equation 2. As seen in the upper window of FIG. 4G, a received double pulse $P_3$ that has passed through a tuned equalizer 111 exhibits no difference (i.e., no error) between the sampled values (at times $T_1$ and $T_2$), because the tuning process has minimized this error to near zero. As a result, the eye diagram shown in the lower window of FIG. 4G, displays a marked decrease in the amount of ISI and noise when compared to the simulated unequalized signal in FIG. 4F. Accordingly, these simulation results show that after equalization with the tuning circuit 110, it becomes possible to place a voltage threshold at a single voltage level (e.g., 0.5V) to detect a received signal as 'high' or 'low' with a reasonable amount of accuracy. In other words, because the eye is open in FIG. 4G, the simulation shows that with the use of the tuned equalization techniques disclosed herein, data can be reliably received and interpreted at the receiver. In the simulation of FIG. 4G, approximately 100 tuning iterations were required for the error term to converge to near zero, and a scaling factor of $\mu=1$ was used, although in other simulations or actual circuit implementations, other values could be used.

Figure 6A:
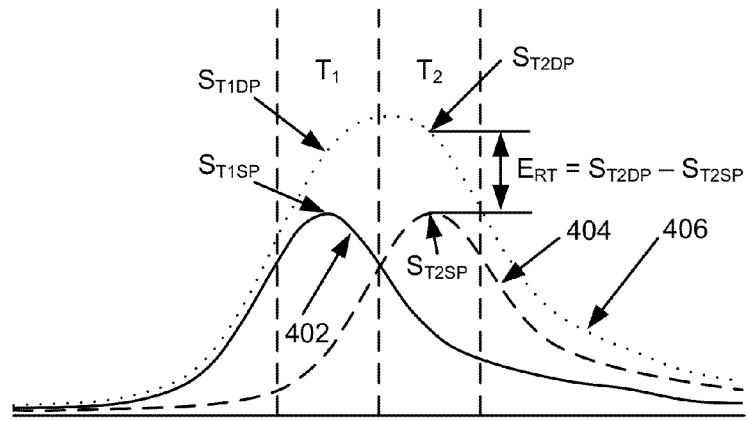
FIG. 6A illustrates the derivation of reduced tail error in accordance with one or more embodiments of the invention.
Figure 6B:
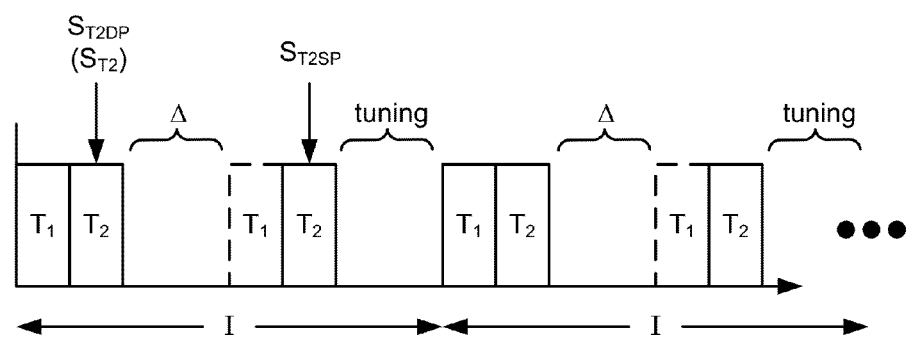
FIG. 6B illustrates training signals for reduced tail tuning in accordance with one or more embodiments of the invention.

While the "symmetric pulse" calibration operates using a very simple calibration mechanism, other error metrics may require the transmitter to send more complicated training signals to the receiver during calibration. One such example is shown in FIGS. 6A and 6B. Here, calculation of a "reduced tail" error metric, $E_{RT}$, requires the transmitter to send both a double pulse and a separate single pulse, as shown in FIG. 6B. A goal of tuning using this error metric is to reduce the error between the single and double pulse during the second UI. In this regard, a double pulse is sent first, and the value of that pulse 406 is sampled during UI $T_2$ as $S_{T2DP}$, which is read as the sample of the double pulse during UI 2. Later, a single pulse is sent during UI $T_2$ from the transmitter, and that single pulse 404 is likewise sampled during the corresponding UI $T_2$ at the receiver as $S_{T2SP}$ corresponding to the sampled peak value of the single pulse. The reduced tail error metric, $E_{RT}$ comprises the difference between these two samples in the second time interval ($E_{RT}=S_{T2DP}-S_{T2SP}$), and iterative minimization of this error term via Q tuning (or $\omega_0$ or z tuning) as described above eventually reduces ISI.

Figure 6C:
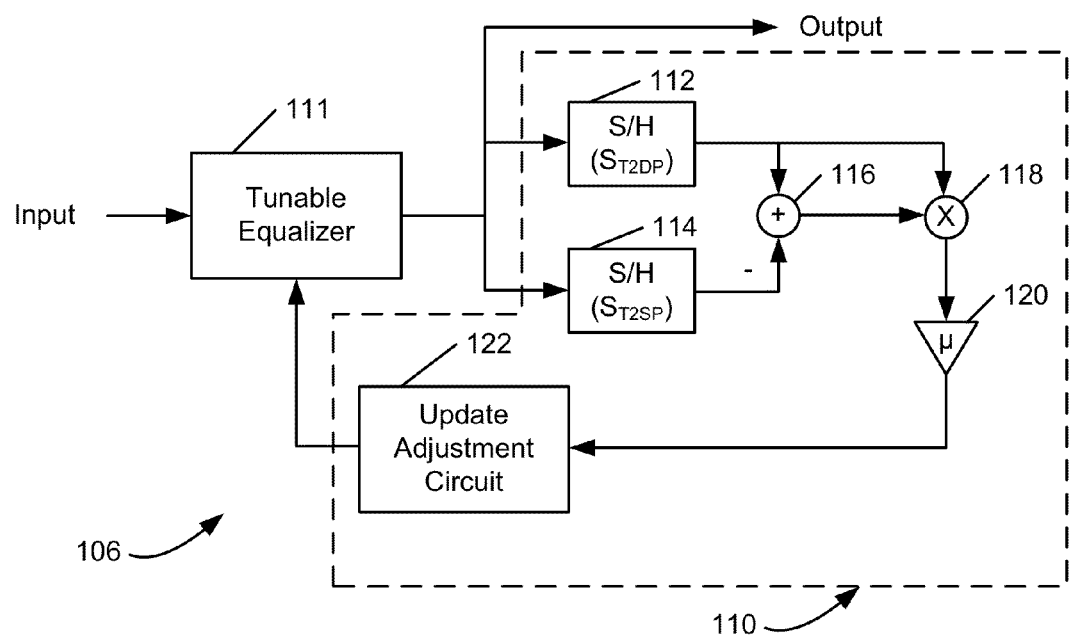
FIG. 6C illustrates a block diagram for reduced tail tuning in accordance with one or more embodiments of the invention.

As can be seen in FIG. 6B, one tuning interval, I, according to this embodiment of the error metric, requires the issuance of both a double pulse and a single pulse. These pulses are separated by a small time gap, Δ, sufficient to allow for settling of the post-cursor ISI or tail of the double pulse. After the issuance of the single pulse, and after both $S_{T2DP}$ and $S_{T2SP}$ have been captured by the tuning circuit 110, tuning of the equalizer may begin. The tuning circuit 110 for implementing $E_{RT}$ is shown in FIG. 6C, the operation of which should be apparent to those of skill in the art particularly as informed by the discussion of the previous tuning circuit implementing the symmetric pulse calibration. While the described order of the pulses in the reduced tail calibration places a double pulse ahead of a single pulse in the training signal pattern, the single pulse could precede the double pulses during each tuning interval, I, without any effect to the error metric, $E_{RT}$.

Figure 7A:
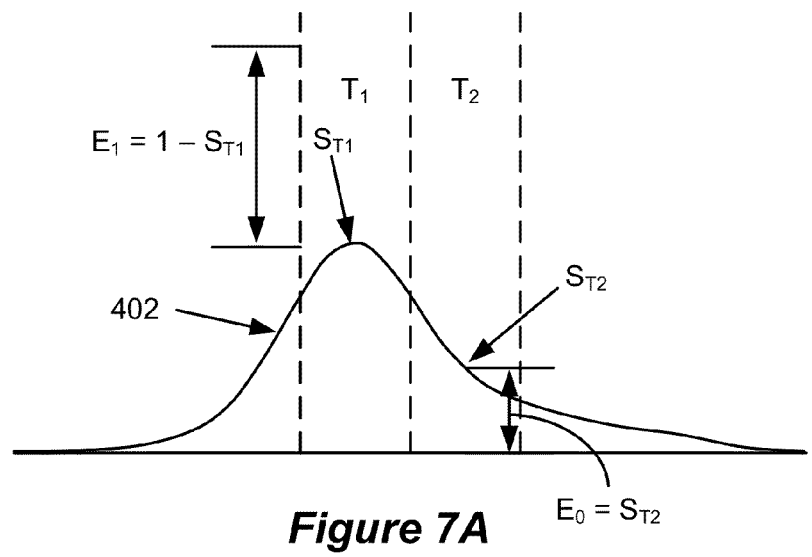
FIG. 7A illustrates the derivation of 1 and 0 error in accordance with one or more embodiments of the invention.
Figure 7B:
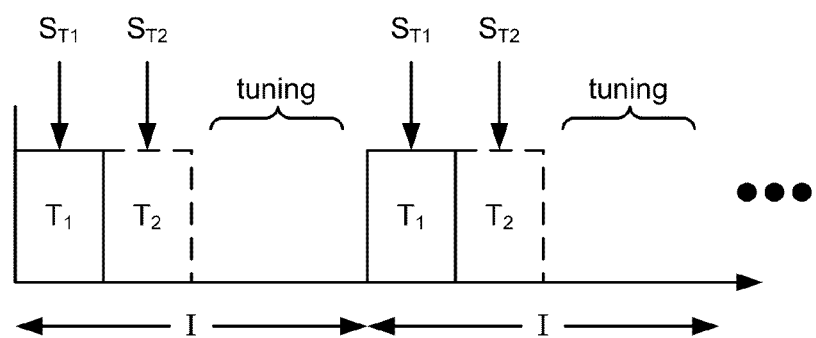
FIG. 7B illustrates training signals for 1 and 0 tuning in accordance with one or more embodiments of the invention.

As discussed above, various error terms may be derived from the received training signal sent by the transmitter, and various equalizer coefficients may be tuned based on the error terms. For example, an error term denoted the zero error ($E_0$) may be derived from a single '1' pulse received at receiver 106. FIG. 7A shows the derivation of $E_0$. In FIG. 7B, a single '1' pulse training signal is sent from a transmitter across a lossy channel, and received by a receiver, in a time interval $T_1$ (see FIG. 7A). $E_0$ is obtained by sampling the single pulse during UI $T_2$, resulting in the sampled value $S_{T2}$. Because a second single pulse training signal is not sent or received in UI $T_2$, $S_{T2}$ represents only the sampled value of the single pulse during UI $T_2$. Thus, $S_{T2}$ represents the residual energy or ISI caused by a single pulse in the UI following the pulse, and should be zero. Therefore, the difference between the sampled value $S_{T2}$ and 0 (or another value that represents the magnitude of an ideal sampled '0' value during the time interval $T_2$ when no pulse is received), is the zero error, $E_0$. Iterative reduction of this error term by tuning the tunable equalizer circuit 111 helps reduce post-cursor ISI, and in a preferred embodiment can be used to tune the quality factor Q or other transfer function variable of the equalizer using the techniques otherwise previously described with respect to FIGS. 4-5.

A second error term, denoted the one error ($E_1$), may also be derived from the single pulse training signal described above in FIG. 7A. This error term may be used with $E_0$ to tune a tunable equalizer circuit 111 according to one or more embodiments of the invention, discussed in further detail below. Briefly, the pulse is sampled during UI $T_1$, resulting in sampled value $S_{T1}$. Because a '1' pulse is not sent or received in the UI preceding or following $T_1$, $S_{T1}$ effectively represents only the sampled value of the single pulse, and should comprise a perfect '1' value. Therefore, the difference between the sampled value $S_{T1}$ and 1 (or another value that represents the magnitude of an ideal received '1' pulse during the time interval $T_1$) is the one error, $E_1$. Iterative reduction of this error term by tuning the tunable equalizer circuit 111 helps maximize the detected value of a received signal (i.e., brings the detected value closer to the value of an ideal signal sent across an ideal channel), and in a preferred embodiment can be used to tune the quality factor Q or other transfer function variable (e.g., z, $\omega_0$) of an equalizer. Thus, to summarize in general terms, the disclosed error terms may be viewed as comprising a difference between a magnitude of an actual received signal and an ideal magnitude.

While the error terms illustrated in FIGS. 7A and 7B show measurements taken during (in the case of $E_1$) or after (in the case of $E_0$) the unit intervals in which the training signals are sent, it should be realized that similar error metrics can be crafted using measurements taken before the unit interval of interest, i.e., on the leading tail of the dispersed pulse of FIG. 7A.

Figure 7C:
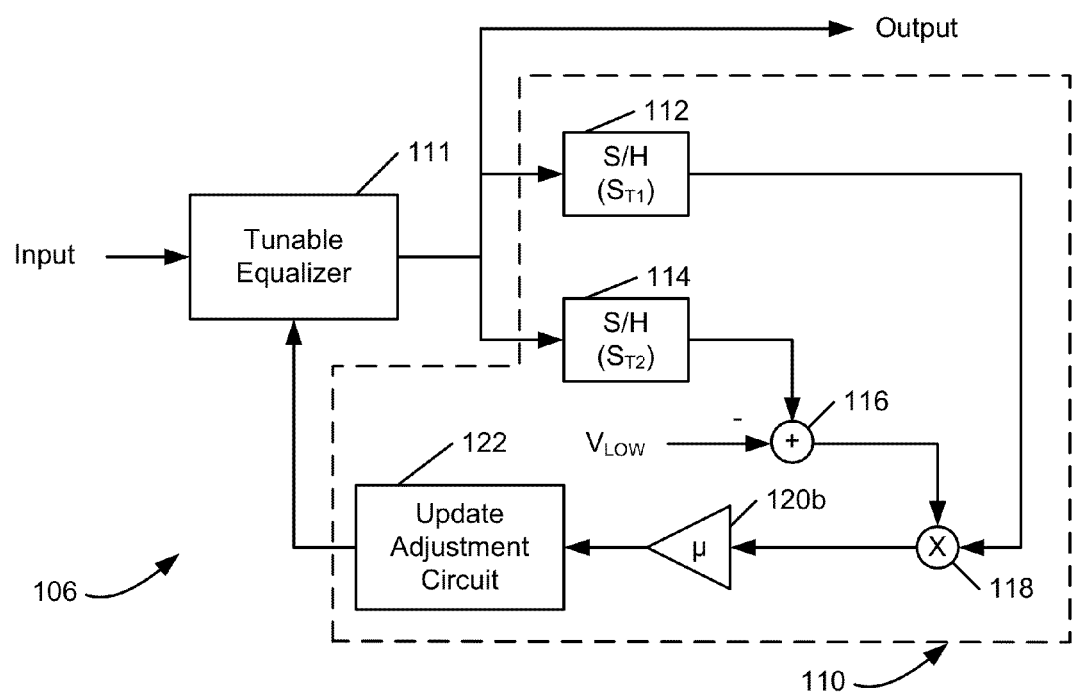
FIG. 7C illustrates a block diagram for 0 tuning in accordance with one or more embodiments of the invention.

FIG. 7C shows a block diagram of a tuning circuit 110 useful in implementing the zero error ($E_0$) metric. After initialization of the circuit, a training signal (a single pulse; see FIG. 7A) is received from channel 104 by a tunable equalizer circuit 111, and ultimately by a sample-and-hold block 112 that samples the received signal during the first time interval $T_1$. Additionally, a second sample-and-hold block 114 samples any residual of the received signal during the second time interval $T_2$. $V_{LOW}$ (the value of a '0' pulse) is subtracted from $S_{T2}$ at addition block 116. This results in the error term $E_0$, which is multiplied by the sampled value $S_{T1}$ at multiplier 118 to normalize its value. The product is then scaled by a scale factor μ in buffer 120b, which results in the update term used in the update adjustment circuit 122 for the next coefficient value (i.e., $Q(n+1)=Q(n)+\mu S_{T1}E_0(n)$) in the tunable equalizer circuit 111.

One skilled in the art will appreciate from the foregoing discussion that while single and double pulse training signals are discussed for the sake of simplicity and clarity, other numbers of pulses may similarly be used in the formation of other error metrics. For example, in the reduced tail algorithm discussed above, rather than subtracting a single pulse from a double pulse, a single pulse may be subtracted from a triple pulse (i.e., the sampled cursor value of a series of three consecutive '1' pulses during a time interval $T_3$) to compensate for higher-order levels of ISI. Similarly, in the zero error algorithm discussed above, a triple pulse (or a larger pulse) could be used. An alternative technique for accounting for ISI, similar to the symmetry pulse calibration algorithm discussed above, comprises comparing (i.e., taking the difference in voltages between) the first and last UIs of a triple (or larger) pulse.

Figure 8:
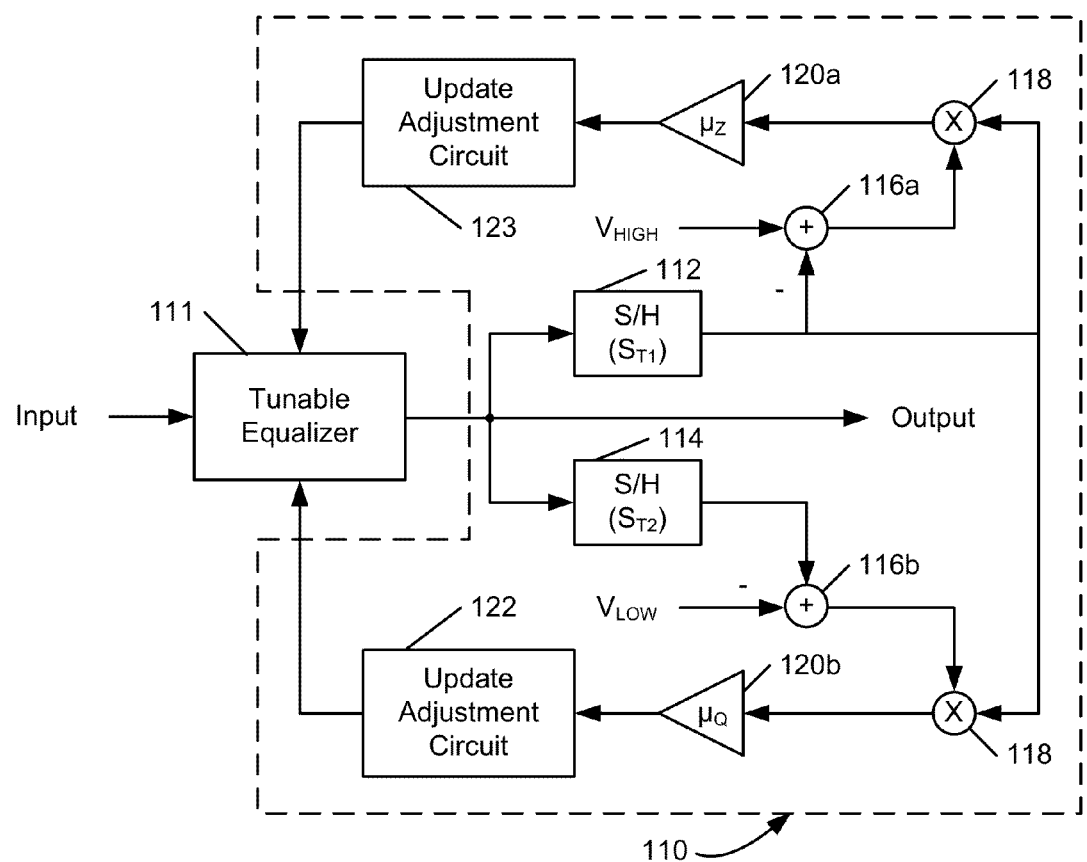
FIG. 8 illustrates a block diagram for 1 and 0 tuning in accordance with one or more embodiments of the invention.

To this point in the disclosure, embodiments of the technique have focused on tuning a single equalizer coefficient, such as Q. However, in other embodiments, multiple coefficients may similarly be simultaneously tuned with modifications to the circuit design. In this regard, FIG. 8 shows a tuning circuit 110 for tuning both the quality factor, Q, and the zero, z, of the transfer function. In FIG. 8, a single pulse training signal received for tuning both Q and z allows for calculating a zero error $E_0$ and a one error $E_1$, with each of these error metrics being used to tune Q and Z respectively. In other words, these two error terms may be used together to tune a tunable equalizer circuit 111 according to one or more embodiments of the invention. After equalization (111), the single pulse is passed to the tuning circuit 110, where a first sample-and-hold block 112 samples the received signal during the first time interval $T_1$, and where a second sample-and-hold block 114 samples the residual of the received signal during the second time interval $T_2$. A difference is taken between each of these two sample values and $V_{LOW}$ or $V_{HIGH}$ (i.e., $S_{T1}$ is subtracted from $V_{HIGH}$, and $V_{LOW}$ is subtracted from $S_{T2}$) at addition blocks 116a and 116b. This results in the two error terms, $E_1$ and $E_0$, discussed above.

Each error term is then used to optimize one of the coefficients to be tuned. Specifically, $E_0$ is used to tune Q, while $E_1$ is used to tune z. As can be seen, each of the computed error metrics $E_0$ and $E_1$ are multiplied by the sampled value $S_{T1}$ at multipliers 118, and are then further scaled by scalars appropriate for both Q and z tuning (i.e., by $\mu_Q$ in buffer 120b and $\mu_z$ in buffer 120a). This results in the update LMS terms for the coefficient values of the tunable equalizer circuit 111 (i.e., z(n+1) and Q(n+1)). Of course, this technique requires the use of an equalizer 111 whose Q value and z value are both tunable, and in this regard Q-tunable and z-tunable equalizers can be combined from the prior art. Like Q-tunable equalizers, z-tunable equalizers are well known in the art, and one example can be found in FIG. 4.6.2 of "A 20 Gb/s Forwarded Clock Transceiver in 90 nm CMOS," by B. Casper et al., in Solid-State Circuits, 2006 IEEE International Conference Digest of Technical Papers, pp. 263-272 (Feb. 6-9, 2006), which is incorporated herein by reference. Similarly, $\omega_0$-tunable equalizers are well-known in the art for embodiments where the peaking frequency is tuned. One example can be found in FIG. 4 and the associated discussion on page 4 of the paper titled "Self-Calibrating Continuous-Time Equalization Targeting Intersymbol Interference," by Hollis et al., Proceedings of the IEEE North-East Workshop on Circuits and Systems, Gatineau, Canada, pp. 109-112 (June 2006), discussed above.

Returning to FIG. 4E, in addition to allowing for Q-tuning based on a gate bias voltage Qbias of a transistor 113 as discussed earlier, the tunable equalizer circuit 111 also allows for tuning of the z coefficient, and hence can be used in conjunction with the tuning circuit 110 of FIG. 8. Thus, tuning Q with $E_0$ is accomplished in the manner discussed above with reference to FIGS. 4D and 4E. Tuning z with $E_1$ is accomplished by adjusting either $R_{z1}$ and $R_{z2}$ or $C_{z1}$ and $C_{z2}$, or both of these pairs, with the update adjustment circuit 122, which in this embodiment obviously includes these variables as outputs to the equalizer 111. Although not adjusted in this embodiment, one skilled in the art will appreciate that $\omega_0$ may be similarly tuned by adjusting a capacitive array output of the update adjustment circuit 122 (not shown), which selects one or more pairs of transistors ($Q_{C1}$-$Q_{Cn}$) from the capacitive array $C_1$-$C_n$, to control the tunable filter coefficient value $\omega_0$ of the tunable equalizer circuit 111.

Figure 9A:
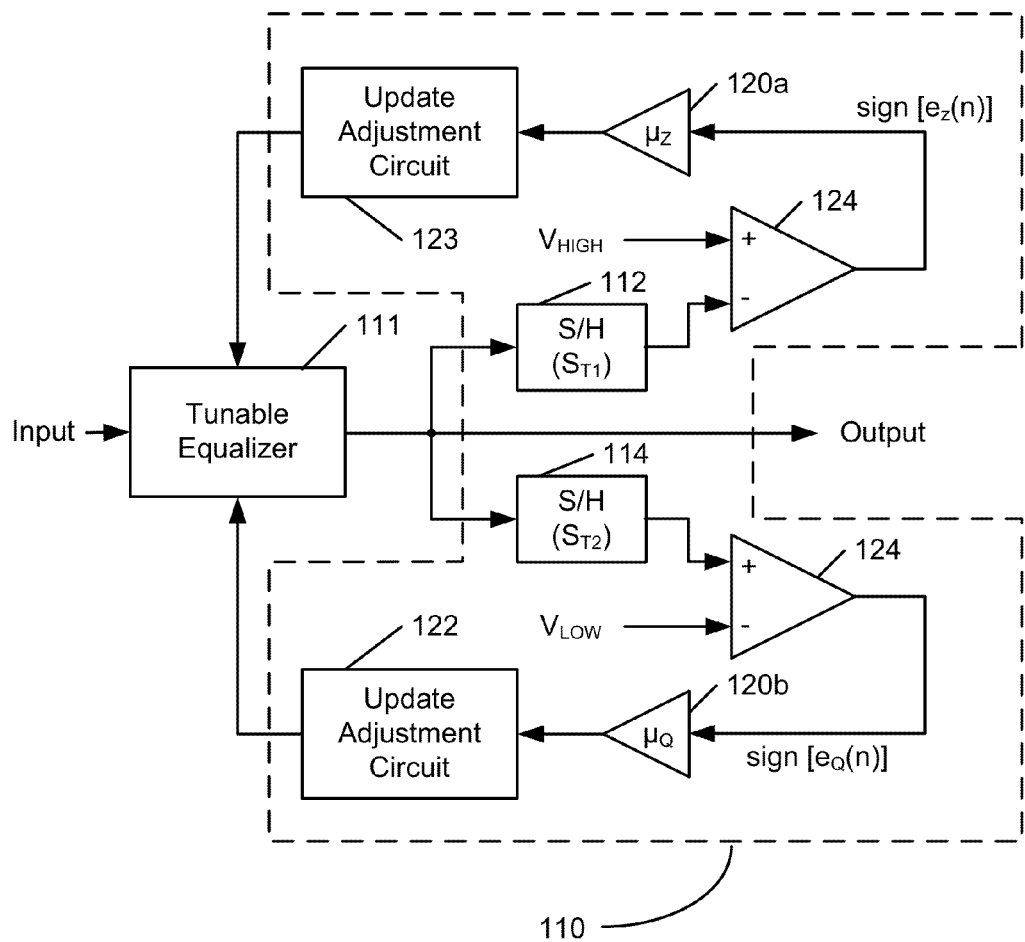
FIGS. 9A-9C illustrate block diagrams for 1 and 0 tuning in accordance with one or more embodiments of the invention.
Figure 9B:
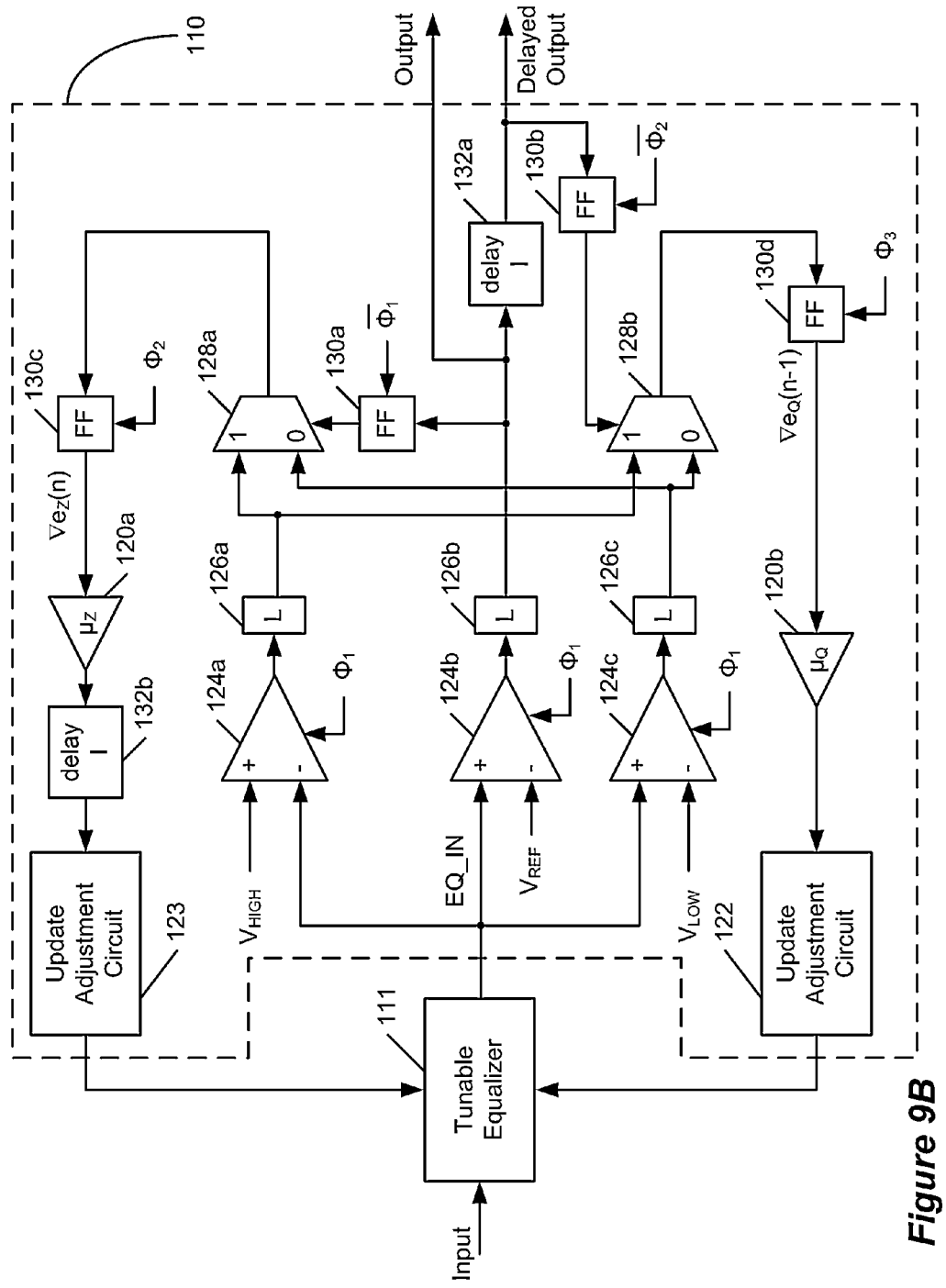
Figure 9C:
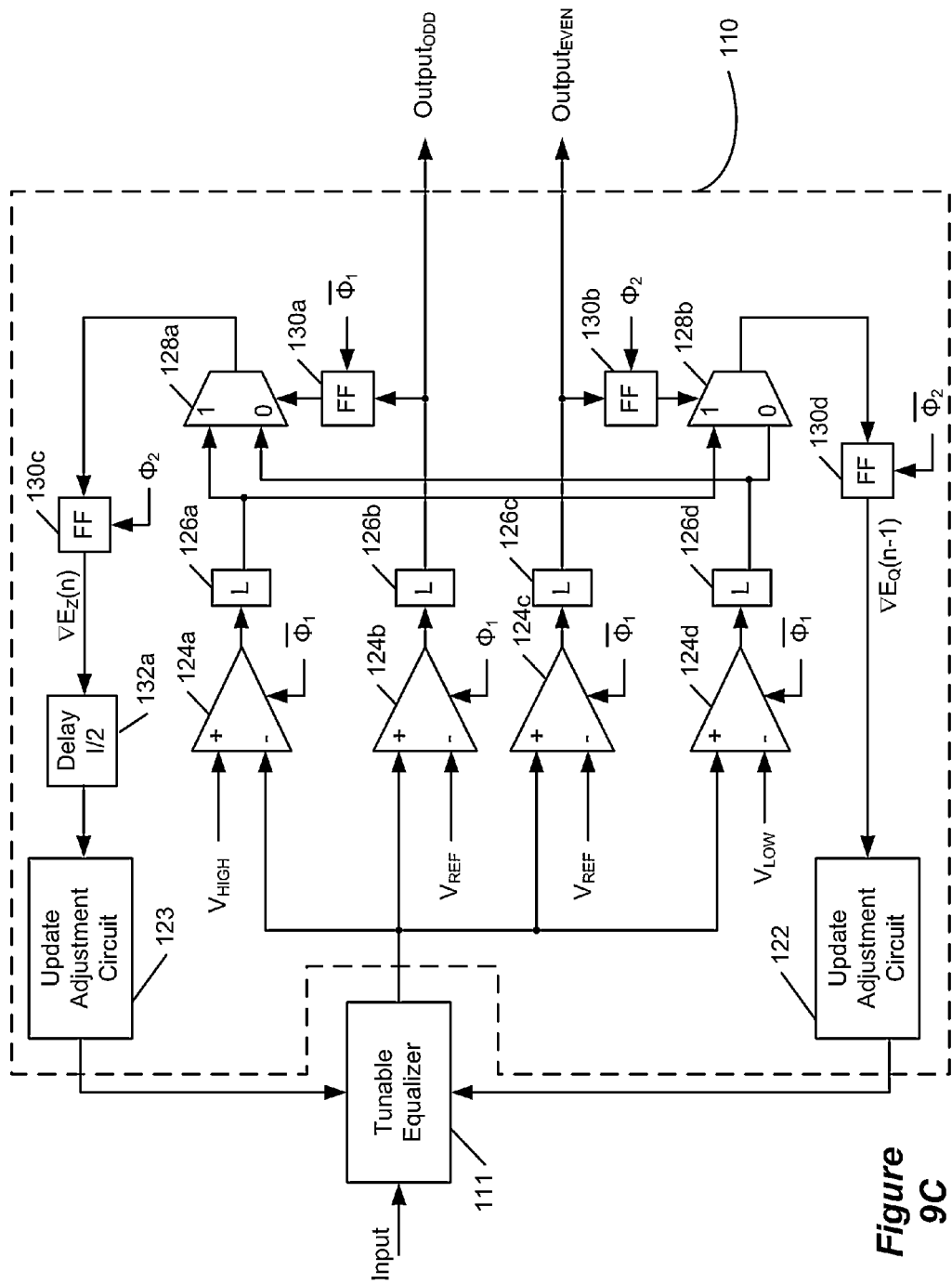

A number of modifications can be made to the various tuning circuits 110 set forth above, some of which are shown in FIGS. 9A-9C. The modifications in FIGS. 9A-9C show modifications to the Q-and z-tuning circuitry of FIG. 8, but one skilled in the art will understand that these same modifications could be made to the other tuning circuits discussed previously. In other words, the circuit may be modified to tune any combination of Q, $\omega_0$, or z. For reference, the paper titled "An Accurate Automatic Quality-Factor Tuning Scheme for Second-Order LC Filters," by F. Bahmani et al, IEEE Transactions on Circuits and Systems I, Vol. 54, No. 4, pp. 745 (April 2007) shows techniques for designing circuits to tune these coefficients. This paper is hereby incorporated by reference in its entirety.

In one modification, rather than taking a difference to determine a magnitude of an error, the sign of the error may simply be used, as shown in FIG. 9A. In FIG. 9A, the adders 116 and multipliers 118 of FIG. 8 have been replaced by comparators 124. More specifically, the output of the sample-and-hold block 112, which samples during time interval $T_1$, is compared to $V_{HIGH}$, while the output of the sample-and-hold block 114, which samples during time interval $T_2$, is compared to $V_{LOW}$. Thus, for each comparator, the output represents the sign of the error, sign[e(n)]. The use of comparators allows for the error to be quantized, and for the error to converge digitally during tuning. A digital-to-analog converter or bandgap voltage reference (not shown) is optionally included to stabilize $V_{HIGH}$ and $V_{LOW}$ in the digital circuit.

While the above discussed circuit designs may be implemented such that the tuning circuit 110 is active only during calibration and before regular operation of the circuit in which it sits (i.e., during calculation of coefficients for the tunable equalizer circuit 111), tuning may also occur during actual operation of the receiver circuit 106, using pulses received during regular operation of the receiver 106. FIGS. 9B and 9C show such real-time continuous tuning examples. In FIGS. 9B and 9C, the tuning circuit 110 and the tunable equalizer circuit 111 operate concurrently, on the rising edge of every clock cycle $\Phi$. However, while the tunable equalizer processes an input signal in a single clock cycle, the tuning circuit 110 requires at least three clock cycles to calculate a tuned coefficient value, and thus the tuning circuit 110 operates in stages over a plurality of clock cycles. These stages are indicated, e.g., by the clock cycles $\Phi_1$, $\Phi_2$, and $\Phi_3$ in FIGS. 9B and 9C.

Thus, while the tuning circuit 110 can receive an input value from the tunable equalizer circuit 111 on every clock cycle, and it operates concurrently with the tunable equalizer circuit 111, the tuning circuit 110 requires three clock cycles to calculate and update subsequent tuned filter coefficients (e.g., z, $\omega_0$, Q). This is accomplished by the tunable equalizer circuit 111 outputting an output signal on every clock signal $\Phi$, and for each clock cycle that a tuning operation is performed in the tuning circuit 110, the tuning circuit 110 produces tuned coefficients for that clock cycle delayed by three clock cycles. Accordingly, while the update adjustment circuits 122, 123 tune the tunable equalizer 111 with a slight delay in comparison to any received input pulse (or lack thereof), the tuning circuit 110 may still update coefficients of the tunable equalizer 111 for every received pulse, rather than for a predetermined sequence of training signals. One skilled in the art will appreciate that while a delay of three clock cycles is discussed with respect to FIGS. 9B and 9C, similar circuit designs may require more or fewer clock cycles to produce tuned filter coefficient values.

In the tuning circuit 110 shown in FIG. 9B, three comparators (124a, 124b, 124c) are used to compare the output of tunable equalizer circuit 111 to $V_{HIGH}$, $V_{REF}$, and $V_{LOW}$. $V_{REF}$ is a mid-range threshold value used to determine whether a pulse is a '0' or a '1.' Latches 126a-126c have been added to stabilize the values of the comparators 124a-124c. Delay element 132a and flip-flop 132b provide a delay of I (one UI) to create proper timing for the Q and z update values.

Multiplexers 128a and 128b use the latched output from comparator 124b to switch between the outputs of comparators 124a and 124c. Thus, when a received pulse is detected as a '1' (as determined by comparator 124b), the outputs of multiplexers 128a and 128b increment or decrement the z and Q coefficients based on the output of comparator 124a in a future clock cycle. Alternatively, when a received pulse is detected as a '0,' the outputs of multiplexers 128a and 128b increment or decrement the z and Q coefficients based on the output of comparator 124c in a future clock cycle. In this manner, the tuning circuit 110 shown in FIG. 9B may be kept operational in the receiver circuit 106, and the receiver circuit 106 does not need to be stopped at any time for re-calculation of equalizer coefficients.

Figure 10:
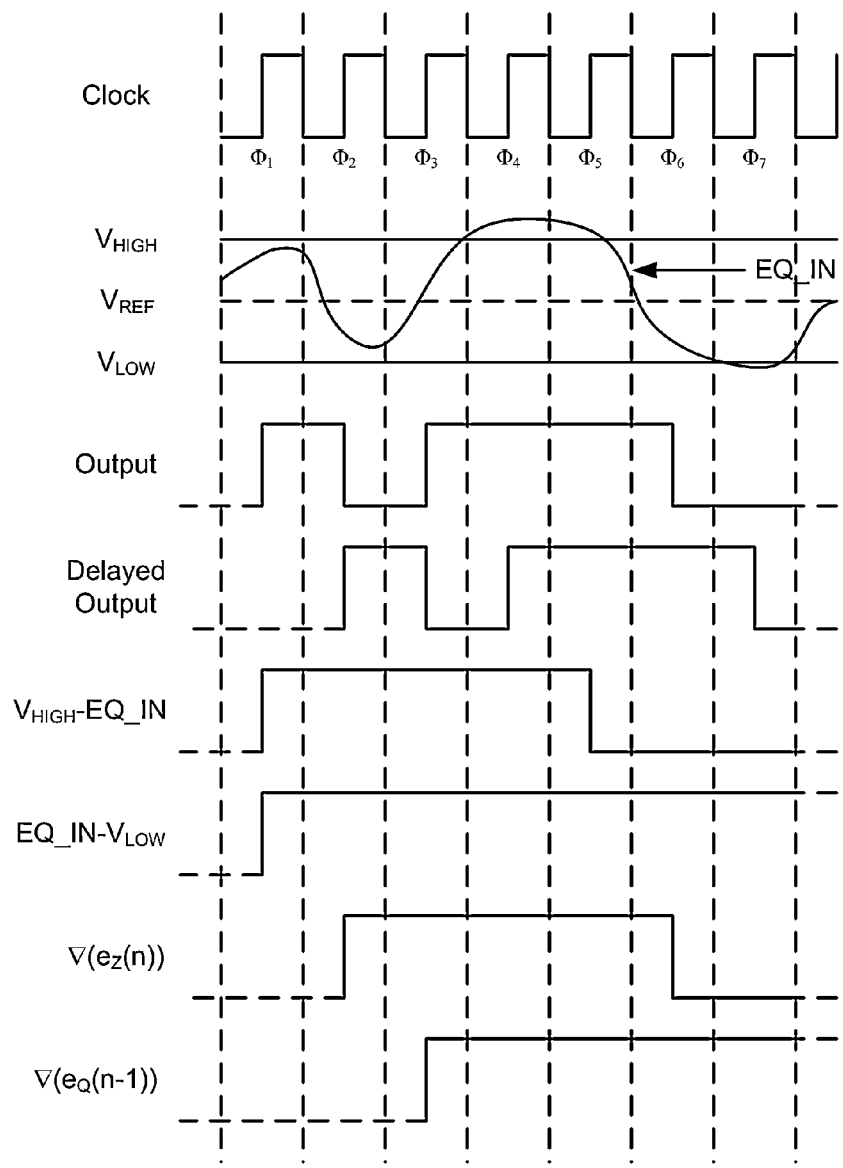
FIG. 10 illustrates a timing diagram for the circuit of FIG. 9B.

Effects of the tuning circuit 110 shown in FIG. 9B may be seen in the simulated timing diagram shown in FIG. 10. An exemplary received input signal EQ_IN is received in receiver 106, for example from a channel 104. For purposes of explanation, the signal is sampled by the tuning circuit 110 during time intervals $\Phi_1$ and $\Phi_5$, and these sampled values are processed to tune the tunable equalizer circuit 111 in subsequent time intervals ($\Phi_2$-$\Phi_3$, and $\Phi_6$-$\Phi_7$, respectively), concurrent to operation of the tunable equalizer circuit 111. During time interval $\Phi_1$, a high value is sampled from the signal EQ_IN, but the sampled value is less than $V_{HIGH}$. Thus, $V_{HIGH}$-EQ_IN and EQ_IN-$V_{LOW}$ transition to high during time interval $\Phi_1$. Accordingly, $\nabla(e_z(n))$ transitions to high during time interval $\Phi_2$ (based on the last "Output" value deciding which comparator 124a, 124c output is chosen at mux 128a), and $\nabla(e_Q(n-1))$ also transitions to high during time interval $\Phi_3$ (based on the last "Delayed Output" value deciding which comparator 124a, 124c output is chosen at mux 128b). During another interval $\Phi_5$, a high value is again sampled from pulse EQ_IN. However, this time the sampled value of EQ_IN is greater than $V_{HIGH}$. Thus, $V_{HIGH}$-EQ_IN transitions from high to low while EQ_IN-$V_{LOW}$ remains high during time interval $\Phi_5$. As a result, $\nabla(e_z(n))$ transitions from high to low during time interval $\Phi_6$, and $\nabla(e_Q(n-1))$ remains high during time interval $\Phi_7$, again based on the last "Output" and "Delayed Output," respectively. One skilled in the art will appreciate that similar effects may be simulated and observed when a low value is sampled from the signal EQ_IN (for example, if the signal EQ_IN were sampled by the tuning circuit 110 during time intervals $\Phi_2$ or $\Phi_7$).

The tunable circuit 110 shown in FIG. 9C includes the features of the tunable circuit shown in FIG. 9B, and additionally provides for half-rate continuous-time tuning. Half-rate operation is a necessary feature in many circuit applications, such as memory operation, and is accomplished by comparing the output of the tunable equalizer circuit 111 to $V_{REF}$ in alternate clock cycle phases in comparators 124b and 124c. As discussed with reference to FIG. 9B, the output of the tunable equalizer circuit 111 is also compared to $V_{HIGH}$ and $V_{LOW}$ in comparators 124a and 124d. Then, the latched output values from comparators 124b and 124c are used in flip-flops 130a and 130b to decide which output of comparators 124a and 124d is passed through multiplexers 128a and 128b. In a preferred embodiment, delay element 132a is included to provide a delay of I/2 (one-half of a UI) to create proper timing for the Q and z update values. One skilled in the art will appreciate that the circuit shown in FIG. 9C may also be modified to provide for other clock rate implementations, such as quarter-rate continuous-time tuning.

A number of equalizer circuits may be implemented to tune the z, $\omega_0$, or Q coefficients in the various embodiments of the invention depending on factors such as the desired coefficients to be tuned, the cost of components required for the circuit, the added power of tuning circuitry, and space requirements on a circuit board or within an integrated circuit. Examples of possible equalizer circuits used in accordance with one or more embodiments of the invention include, but are not limited to, Sallen-Key equalizers, phase-shift filters, Cherry-Hooper amplifiers, Q-enhanced active lowpass filters, and two-stage amplifiers with feed-forward compensation. One skilled in the art will appreciate that while the z, $\omega_0$, and Q coefficients discussed above apply to the second order filter transfer functions of Equations 1 and 2, other transfer functions may be used to model particular equalizers, and accordingly, other coefficients and equalizer circuits may be used to correspond to the transfer function.

Regardless of whether the z, $\omega_0$, and Q coefficients are fixed or tuned, accurately initializing the coefficients provides more accurate equalization and also allows the errors of the tuned coefficients to be minimized more efficiently. Although logically estimating fixed coefficient values is presented above, numerical analysis (i.e., simulation of the channel with commercial computer software, e.g., ModelWare, Matlab, or Mathematica) provides an alternate method of determining values to use for fixed z, Q, and $\omega_0$ coefficients.

One skilled in the art will appreciate that there are numerous deviations from the above illustrated embodiments according to the invention. For example, a tunable circuit 110 may be incorporated into a receiver 106, or it may be separate from the receiver 106. Further, while embodiments of the invention have been discussed using CMOS components and continuous-time filters, embodiments of the invention may also be implemented with components such as bipolar transistors. Bi-polar components are useful for analog operations such as addition and multiplication discussed, for example, in FIG. 4C. Bi-polar and heterojunction-bi-polar transistors may also facilitate higher speed operation. Further, many of the disclosed techniques are also applicable to discrete-time filter systems.

One skilled in the art will appreciate that as used in this specification, the term "normalize" (e.g., to normalize a frequency response) means to produce a value that is as flat as possible over a bandwidth of interest, including modifying values related to magnitude, phase, and frequency. One skilled in the art will appreciate that this does not necessarily mean that an entire frequency range (e.g., of a channel) will be normalized. Further, this does not require that the response is a perfect response (i.e., resulting in a unity value).

While preferred embodiments of the invention have been disclosed, it should be understood that the disclosed circuitry can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A method for tuning an equalizer coupled to a channel, the channel having a frequency response, comprising:
   receiving at least one training signal at the equalizer, wherein the at least one training signal comprises a pulse, wherein the at least one training signal is sent through the channel;
   assessing the at least one training signal to deduce a first error term and a second error term, wherein the first error term comprises an error in a received magnitude of the pulse, and wherein the second error term comprises an error in the received training signal outside of the pulse;
   tuning the equalizer using the first and second error terms; and
   repeating the above steps to minimize the first and second error terms.

2. The method of claim 1, wherein the equalizer comprises a transfer function comprising a plurality of variables, and wherein tuning the equalizer comprises tuning two of the variables of the transfer function while other variables of the transfer function are fixed.

3. The method of claim 2, wherein tuning the equalizer comprises simultaneously tuning the two of the variables of the transfer function using the first and second error terms.

4. The method of claim 2, wherein the transfer function comprises a second-order filter having a single zero and a complex pole.

5. The method of claim 4, wherein the plurality of the variables of the transfer function comprises a quality factor, a zero frequency, and a peaking frequency.

6. The method of claim 1, wherein repeating the above steps to minimize the first and second error terms comprises repeating the above steps until the first or second error term reaches a limit.

7. A receiver for receiving digital data sent through a channel having a frequency response, comprising:
   an equalizer coupled to the channel, the equalizer for producing an output to other circuitry in the receiver, wherein the equalizer comprises a transfer function comprising a plurality of variables, and wherein the equalizer is configured to tune at least one variable of the transfer function while other variables of the transfer function are fixed; and a tuning circuit coupled to the output of the equalizer for continually assessing at least one error for each of a continuous sequence of training signals received by the equalizer, wherein the tuning circuit continually converges the at least one error to tune the equalizer.

8. The receiver of claim 7, wherein the equalizer, the tuning circuit and the other circuitry are integrated in an integrated circuit.

9. The receiver of claim 7, wherein the plurality of variables of the transfer function comprises a quality factor, a zero frequency, and a peaking frequency.

10. The receiver of claim 7, wherein the transfer function comprises a second-order filter having a single zero and a complex pole.

11. The receiver of claim 7, wherein the at least one error comprises a difference between an actual magnitude of the received training signals and ideal magnitudes.

12. The receiver of claim 7, wherein the at least one error comprises a difference indicative of asymmetry in the received training signals.

13. The receiver of claim 7, wherein the training signals comprise single pulses.

14. The receiver of claim 7, wherein the training signals comprise double pulses.

15. The receiver of claim 7, wherein the training signals comprise single and double pulses.

16. The receiver of claim 7, wherein each training signal comprises a single pulse and a plurality of consecutive pulses.

17. The receiver of claim 7, wherein the tuning circuit is only operable during initialization of the receiver.

18. The receiver of claim 7, wherein the tuning circuit is operable during on-going operation of the receiver.

19. The receiver of claim 7, wherein the tuning circuit continually converges the at least one error until a limit is reached to tune the equalizer.

20. A system, comprising:
a transmitter, the transmitter for sending digital data to a receiver across a channel having a frequency response; and the receiver for receiving the digital data, the receiver comprising:
an equalizer coupled to the channel, the equalizer for producing an output to other circuitry in the receiver; and
a tuning circuit coupled to the output of the equalizer for continually assessing the digital data received by the equalizer, wherein the tuning circuit continually tunes the equalizer,
wherein the equalizer comprises a transfer function comprising a plurality of variables, and wherein tuning the equalizer comprises tuning at least one variable of the transfer function while other variables of the transfer function are fixed.

21. The system of claim 20, wherein the transmitter comprises a training signal circuit for sending training signals across the channel to the receiver.

22. The system of claim 21, wherein the training signal circuit and the tuning circuit are only operable during initialization of the system.

23. The system of claim 20, wherein the transmitter and the receiver comprise integrated circuits on a printed circuit board, and wherein the channel comprises a trace on the printed circuit board.

24. The system of claim 20, wherein the transmitter, the receiver, and the channel are integrated on a semiconductor device.

25. The system of claim 20, wherein the plurality of variables of the transfer function comprises a quality factor, a zero frequency, and a peaking frequency.

26. The system of claim 20, wherein the tuning circuit continually determines at least one error for each training signal received by the equalizer, and wherein the tuning circuit continually converges the at least one error toward a nominal value to tune the equalizer.

27. The system of claim 26, wherein the at least one error comprises a difference between an actual magnitude of the received training signals and ideal magnitudes.

28. The system of claim 26, wherein the at least one error comprises a difference indicative of asymmetry in the received training signals.

29. The system of claim 20, wherein the tuning circuit continually tunes the equalizer to a suitable point.

30. A method for tuning an equalizer coupled to a channel, the channel having a frequency response, comprising:
receiving at least one training signal at the equalizer, wherein the at least one training signal comprises a first pulse of a first duration and a second pulse of a second duration, wherein the at least one training signal is sent through the channel;
comparing the received first pulse and the received second pulse to deduce at least one error term;
tuning the equalizer using the at least one error term; and
repeating the above steps to minimize the at least one error term.

31. The method of claim 30, wherein the equalizer comprises a transfer function comprising a plurality of variables, and wherein tuning the equalizer comprises tuning at least one variable of the transfer function while other variables of the transfer function are fixed.

32. The method of claim 31, wherein the transfer function comprises a second-order filter having a single zero and a complex pole.

33. The method of claim 31, wherein the plurality of variables of the transfer function comprises a quality factor, a zero frequency, and a peaking frequency.

34. The method of claim 30, wherein the at least one error term is scaled before tuning the equalizer.

35. The method of claim 30, wherein the equalizer is useable during an actual operation to reduce intersymbol interference in data received on the channel, and wherein tuning the equalizer is performed prior to such actual operation of the equalizer.

36. The method of claim 30, wherein the equalizer is useable during an actual operation to reduce intersymbol interference in data received on the channel, and wherein tuning the equalizer is performed during such actual operation of the equalizer.

37. The method of claim 30, wherein repeating the above steps to minimize the at least one error term comprises repeating the above steps until the at least one error term reaches a limit.

38. A method for tuning an equalizer coupled to a channel, the channel having a frequency response, comprising:
receiving at least one training signal at the equalizer, wherein the at least one training signal consists of a single pulse, wherein the at least one training signal is sent through the channel;
assessing the at least one training signal to deduce at least one error term;

tuning the equalizer using the at least one error term; and repeating the above steps to minimize the at least one error term.

39. The method of claim 38, wherein the equalizer comprises a transfer function comprising a plurality of variables.

40. The method of claim 39, wherein the transfer function comprises a second-order filter having a single zero and a complex pole.

41. The method of claim 39, wherein the plurality of variables of the transfer function comprises a quality factor, a zero frequency, and a peaking frequency.

42. The method of claim 38, wherein the at least one error term is scaled before tuning the equalizer.

43. The method of claim 38, wherein the equalizer is useable during an actual operation to reduce intersymbol interference in data received on the channel, and wherein tuning the equalizer is performed prior to such actual operation of the equalizer.

44. The method of claim 38, wherein the equalizer is useable during an actual operation to reduce intersymbol interference in data received on the channel, and wherein tuning the equalizer is performed during such actual operation of the equalizer.

45. The method of claim 38, wherein repeating the above steps to minimize the at least one error term comprises repeating the above steps until the at least one error term reaches a limit.

* * * * *